United States Patent [19]

Persicke et al.

[11] Patent Number: 4,700,815
[45] Date of Patent: Oct. 20, 1987

[54] VEHICLE SUSPENSION SYSTEM

[75] Inventors: Gunter Persicke, Gwynedd; James R. Child, Clwyd; Peter F. Baker, Gwynedd, all of Wales

[73] Assignee: Quinton Hazell plc, Clwyd, Wales

[21] Appl. No.: 691,881

[22] Filed: Jan. 16, 1985

[30] Foreign Application Priority Data

Jan. 20, 1984 [GB] United Kingdom ............... 8401491

[51] Int. Cl.$^4$ ............................................. F16F 9/34
[52] U.S. Cl. ..................................... 188/286; 188/269
[58] Field of Search ............... 188/288, 298, 314, 316, 188/317, 322.21, 282, 269, 286; 267/8 R, 64.15, 64.19, 64.23, 64.27, 64.28; 152/415

[56] References Cited

U.S. PATENT DOCUMENTS

| 670,725 | 3/1901 | Pickett | 152/415 |
| 1,164,371 | 12/1915 | Lovejoy | 188/286 X |
| 1,794,507 | 3/1931 | Thompson | 188/288 |
| 1,951,565 | 3/1934 | Sonnett | 152/415 |
| 3,945,663 | 3/1976 | Duckett | 188/315 |
| 4,131,266 | 12/1978 | Carter | 188/288 |
| 4,226,408 | 10/1980 | Tomita et al. | 188/315 |
| 4,311,302 | 1/1982 | Heyer et al. | 188/314 |
| 4,411,342 | 10/1983 | Katsumori et al. | 188/315 |
| 4,442,926 | 4/1984 | Muto | 188/317 |

FOREIGN PATENT DOCUMENTS

| 969377 | 5/1958 | Fed. Rep. of Germany | 188/288 |
| 357702 | 1/1906 | France | 188/317 |
| 7005430 | 11/1971 | France . | |
| 7227114 | 2/1974 | France . | |

Primary Examiner—Duane A. Reger
Attorney, Agent, or Firm—Bernard, Rothwell & Brown

[57] ABSTRACT

A suspension damper has a piston 20 slidable in a cylinder 10 containing fluid. A compressible gas space 45 is provided in one end of the cylinder. To permit piston movement valve controlled passages 54 provide differential resistance in opposite directions of movement and an enlongated slot 51 provides a passage without valve control and the cross section of the slot 51 is selected to vary along its length to provide variable rate damping.

7 Claims, 6 Drawing Figures

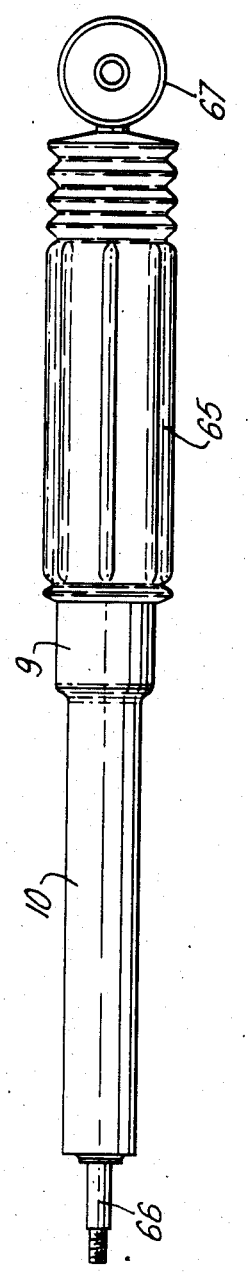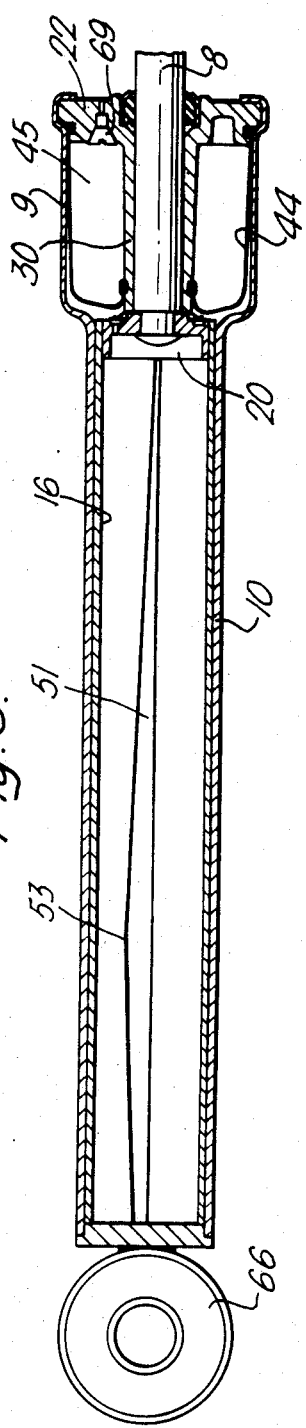

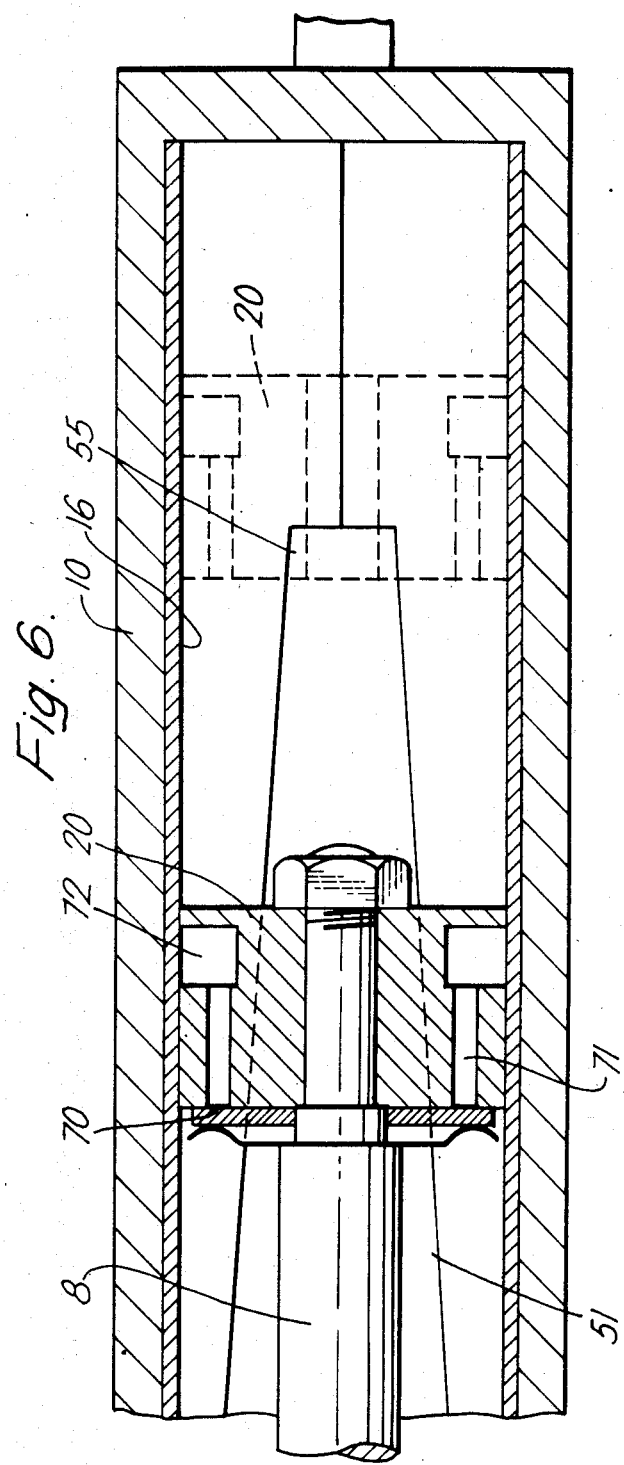

VEHICLE SUSPENSION SYSTEM

BACKGROUND OF THE INVENTION

The invention relates to vehicle suspension dampers.

Vehicle suspension systems are known which include a damper in which a piston slides within a fluid containing cylinder, the piston being connected to a piston rod which extends out of the cylinder. The piston rod and cylinder are connected between the body or chassis of the vehicle and the vehicle springs or axle. Damping is provided by fluid passages which restrict the flow of the fluid past the piston as the piston moves within the cylinder. In such a damper the passages are valve controlled to regulate the flow past the piston in both directions of movement of the piston and some include a gas region as well as hydraulic fluid.

However, such dampers do not provide a simple construction which allows controlled variable rate damping over a variety of operating conditions.

It is an object of the present invention to simplify the construction of a damper of a vehicle suspension system, which will permit effective variable rate damping.

SUMMARY OF THE INVENTION

According to the present invention there is provided vehicle suspension apparatus including damper means comprising a cylinder containing fluid to a required level, a piston arranged for relative sliding movement with the cylinder, a piston rod connected to the piston and extending outside the cylinder and a purality of fluid passage means to permit fluid flow past the piston and to provide a differential flow resistance in opposite directions of relative movement of the piston, characterised in that (a) said fluid passages include the combination of (1) valve controlled fluid passage means to provide differential resistance to relative mvoement of the piston in opposite directions, and (2) a further fluid passage without valve control and permitting fluid flow in both direction, said further passage including means extending longitudinally along the damper to vary the cross section of the further passage with relative movement of the piston, thereby providing variable rate damping, and (b) compressible gas is arranged in the cylinder to act as pressure controlling means to apply a variable pressure on the fluid in the cylinder ahead of the piston during relative movement of the piston to control the damping characteristics.

Preferably the same further fluid passage is an elongated slot of variable cross section between the piston and cylinder and along which the piston slides.

The compressible gas may be contained in a flexible bag located at one end of the cylinder around the piston rod. Alternatively the compressible gas may be contained in one end of the cylinder in contact with the fluid and may mix with the fluid and form cavitations in the fluid.

Preferably the damper is provided with an end closure having a controlled passage leading to the gas space to permit charging with gas. In one arrangement the end closure may have a self sealing closure member which may be pierced for charging with gas and is able to reseal itself.

Preferably the gas is at a pressure of from 8 to 27 or 8 to 20 bars.

In some embodiments spring means may be included in the cylinder and adapted to be compressed by the fluid in response to an increase in the level of the fluid.

Preferably the slot has a cross section which varies along the length of the slot to suit the required damping characteristics and is closed at one end to prevent fluid passage and thereby provide a hydraulic stop when the damper is fully extended. The slot may also be arranged to provide increased hydraulic resistance when the damper is fully compressed.

The invention includes a suspension system as aforesaid in which the damper means is located with the spring means between a body of the vehicle and the vehicle wheel support whereby the piston takes up a rest position in the cylinder dependent on the vehicle loading, the variable cross section of the fluid passage means thereby causing the damper means to provide variable damping characteristics which are automatically adjusted in dependence on the vehicle loading.

The pressure of the gas can either be chosen up suit the working conditions expected of the damper, or the damper can be connected to a source of pressure on the vehicle so that the gas pressure can be varied, even during travel, to alter the characteristics of the damper. The variation of the gas pressure can be controlled manually, automatically or by computer.

Also according to the present invention there is provide a method of damping a vehicle suspension system which includes one or more fluid operated piston and cylinder dampers, which method comprises moving a piston within a fluid containing cylinder, restricting fluid flow past the piston to generate a pressure differential across the piston, the fluid flow restriction being different for movement of the piston in opposite directions, and controlling resistance to movement of the piston by a compressible gas within the cylinder, which is arranged to limit the pressure differential which is developed across the piston during operation of the damper, and thereby permit cavitations to be formed within the fluid on the side of the piston remote from the compressible volume, the fluid being caused to flow past the piston through a passage having no valve control, but varying cross section to alter the hydraulic resistance as relative movement of the piston occurs.

The present invention will now be described by way of example and with reference to the accompanying drawings in which,

BRIEF DESCRIPTION OF THE DRAWINGS

FIG. 4 is an external view of a different embodiment in which the cylinder has one end enlarged.

FIG. 5 is a section through the embodiment of FIG. 4, and

FIG. 6 shows a modification of the above examples.

DESCRIPTION OF THE PREFERRED EMBODIMENTS

Figure 1:
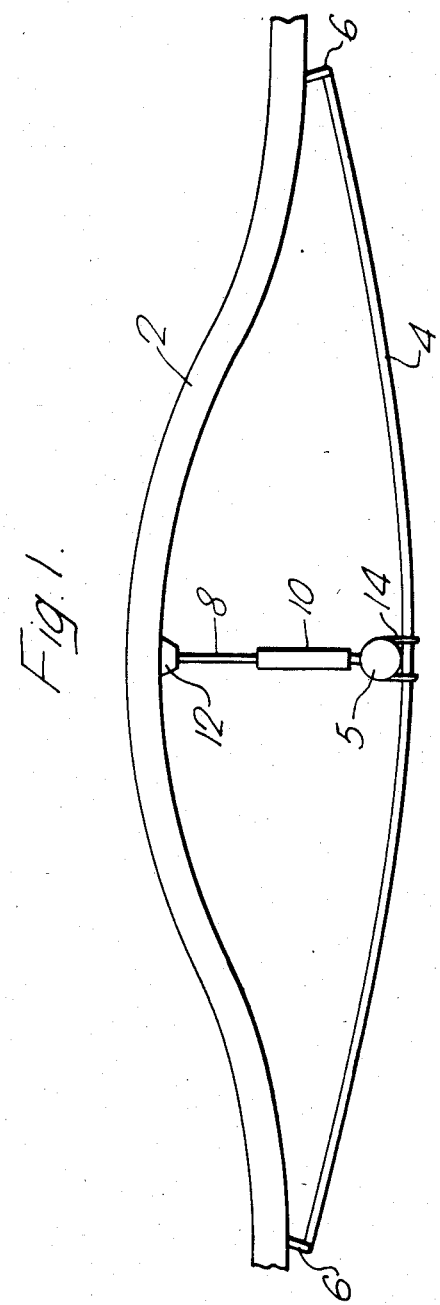
FIG. 1 shows schematicaly part of a vehicle suspension system according to the present invention in which a telescopic variable rate damper is mounted between a suspension spring and a chassis member of the vehicle.

Referring to FIG. 1, there is shown part of a chassis member 2 to which are connected opposite ends of a leaf spring 4 by means of shackles 6. The central portion of the spring 4 carries an axle 5 to which road wheels (not shown) are mounted. Between the chassis 2 and the axle 5 is connected a telescopic damper comprising a piston rod 8 connected to a piston (not shown) within a closed cylinder 10. The piston rod is mounted at its upper end to a bracket 12 fixed to the chassis member 2 and the cylinder is mounted at its lower end to a bracket 14 fixed to the axle 5. Although the damper is shown with the cylinder 10 mounted to the axle 5 and the piston rod 8 mounted to the chassis member 2 the damper may be reversed so that the cylinder 10 is mounted to the chassis member 2 and the piston rod mounted to the spring 4. Movement of the road wheels resulting from the vehicle travelling over irregularities in the road surface causes the spring 4 to deflect, and thereby relative movement between the piston and cylinder of the damper which is damped by displacement of the fluid within the cylinder from one side of the piston to the other (as explained below).

Figure 2:
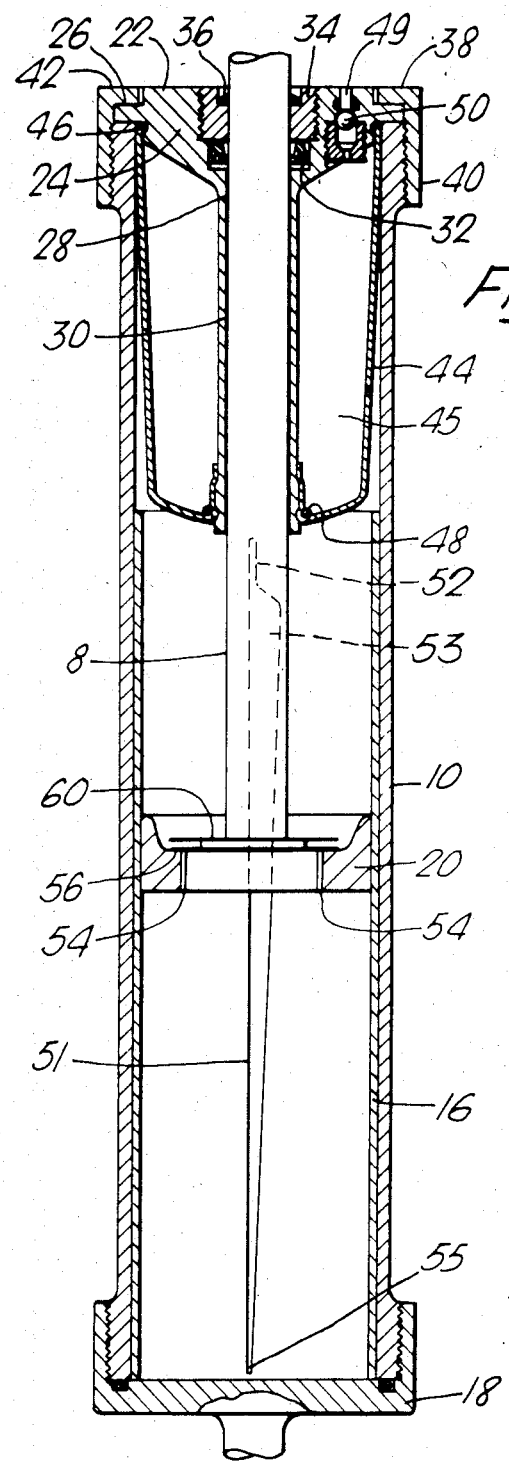
FIG. 2 shows to an enlarged scale a section through a damper which may be used in FIG. 1 in which the cylinder contains a fluid and compressible means in the form of a gas contained in a bag.

FIG. 2 shows a damper which contains within the cylinder 10, a hydraulic fluid such as a glycol and water mixture. The cylinder 10 has a liner 16 in intimate contact with its internal wall and a lower end which is closed by a cap 18 applied to the cylinder 10 in a fluid tight manner. The cap 18 is provided with means for mounting the cylinder 10 to the bracket 14 fixed to the axle 5.

Slidably located within the cylinder 10 is a piston 20 connected to the piston rod 8. The end of the piston rod 8 extending out of the cylinder 10 is mounted to the bracket 12 fixed to the chassis member 2.

A cap 22 is applied to the upper end of the cylinder. The cap 22 comprises a central body portion 24 having an outer annular flange 26 which engages against the upper end of the cylinder 10. The body portion 24 has a central opening 28 through which the piston rod 8 extends and is formed with a tubular portion 30 which extends within the cylinder 10 and surrounds the piston rod 8. Within the opening 28 is a fluid tight annular seal 32 which surrounds and engages the piston rod 8 as it slides within the cylinder 10. The seal 32 is secured within the opening by a threaded plug 34 located in a threaded recess in the body portion 24. The plug 34 is provided with a recess in which sits a further annular seal 36 also surrounding and engaging the piston rod 8. The cap 22 is held against the upper end of the cylinder 10 by an annular member 38 which has a cylindrical threaded portion 40 engaging an external threaded region of the cylinder 10 and a flanged portion 42 abutting the flange 26 of the cap 22.

Within the cylinder 10 is a bag comprising an annular sheet of rubber material 44. One edge of the rubber material is fixed and sealed against the cap 22 at the region 46 where the flange 26 engages the upper end of the cylinder 10 and the opposite edge portion is fixed to and sealed around the inner end of the tubular extension 30 of the cap 22 by means of a spring ring 48 around the extension 30 within the bag 44. The bag 44 and the tubular extension 30 of the cap 22 thereby provide a closed annular gas space 45 within the cylinder and around the piston rod.

Within the body portion 24 of the cap 22 is an opening 49 in which is provided a one-way spring loaded ball valve 50 which opens into the space defined in the bag 44 so that the bag can be charged with gas to a desired pressure.

Extending along the liner 16 is a longitudinal slot 51 which is shaped to provide variable damping characteristics depending on the degree of extension of the damper. In this example the slot 51, as shown in broken lines, is narrow at 52 at the end of the liner 16 adjacent the bag 44 and then diverges over a short distance to a maximum width 53. From this point the slot 51 tapers to its end 55 adjacent the lower end of the cylinder 10. This tapering slot enables the damper to provide high damping when at high vehicle loadings. In this case the piston 20, due to deflection of the springs by the vehicle load, is near the lower end of the cylinder where the fluid in the cylinder can flow along the slot 51 past the piston 20 only at a relatively slow rate, and thereby provide high damping. When at low vehicle loadings, the piston 20 is near the upper end of the cylinder 10 where the fluid can flow past the piston 20 faster due to the wider slot and thereby provide lower damping. This slot configuration is merely an example of various configurations that can be employed depending on the damping characteristics required. Any other configuration can be provided as required.

The piston 8 comprises one-way valves to provide a greater resistance to downward movement of the cylinder 10 (i.e. in the "rebound" direction of the suspension) than upward movement of the cylinder 10 (i.e. the "bump" direction of the suspension). It will be understood that references to upward downward movement refer to relative movement between the piston and cylinder regardless of whether one or both actually move. These one-way valves comprise a number of holes 54 extending through the piston 20, for example, six holes in a ring. Lying flat against the piston 20 at its piston rod or upper side and covering the holes is a flexible plate 56. Spaced from the plate 51 by a spacer 58 is a second plate 60 which limits the amount by which the plate 56 can flex.

If a vehicle encounters a bump the spring 4 will flex upwardly causing the cylinder 10 to rise and the piston 20 to become positioned nearer the lower end of the cylinder. This relative movement between the piston 20 and the cylinder 10 causes the fluid in the cylinder 10 below the piston to flow along the slot 52 between the cylinder wall and the circumferential edge of the piston 20 to the upper side of the piston 20. The pressure of the fluid on the piston 20 also causes the plate 56 to flex away from the upper face of the piston 20 thereby enabling further fluid below the piston 20 to flow through the holes 54 in the piston 20 to the region above the piston 20. As the damper is compressed, the piston rod 8 extends further into the cylinder 10 and therefore the space within the cylinder 10 becomes increasingly occupied by the piston rod 8. To compensate for the consequent increase in the level of the fluid above the piston 20 the bag 44 becomes compressed by the fluid above the piston 20. When the vehicle has passed over the bump the spring 4 deflects downward causing the cylinder 10 to move downwards whereby the piston 8 becomes positioned nearer the upper end of the cylinder 10 and fluid flows back to below the piston through the slot 52. However, because the plate 56 is pressed against the upper face of the piston 20 during this movement by the pressure of the fluid above i.e. ahead of the piston 8, the plate covers the holes 54 in the piston 20 and prevents the fluid above the piston 20 passing through the holes 54. This provides more resistance to expansion of the damper than to compression of the damper.

During expansion of the damper a situation may occur in which in the absence of a compressible volume such as is provided by the gas containing bag 44 the fluid above the piston 20 might not be able to flow past the piston through the slot 51 sufficiently quickly to avoid an undesirable increase in pressure above the piston. This would cause an undesirable increase in resistance to expansion of the damper. To compensate for this the fluid above the piston compresses the bag 44 so that the pressure of the fluid and therefore the resistance to damper expansion is limited to the pressure developed in the bag 44. As the fluid above the piston compresses the bag 44, voids or cavitations can be formed in the fluid below the piston 20.

In an alternative arrangement, instead of using a valve 50 the body portion 24 may have a hole extending through it and leading to an outer end wall of the rubber bag on which is provided a layer of self sealing semi-vulcanised rubber. In order to charge the bag with gas a hypodermic needle or the like is inserted in the hole to pierce the bag. Gas is then passed through the needle into the bag until the gas in the bag reaches the required pressure. The needle is then removed through the hole and the self sealing rubber layer re-seals the bag.

Figure 3:
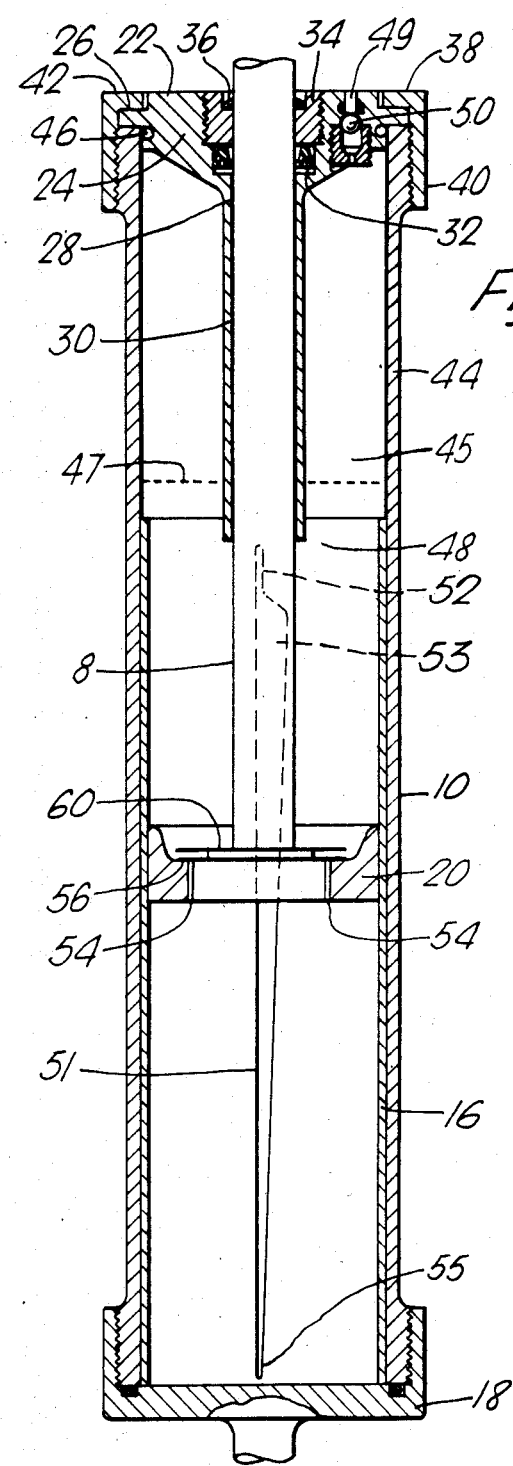
FIG. 3 shows a modification of the damper of FIG. 2 in which the compressible means still comprises gas but the bag is omitted.

FIG. 3 shows an alternative which is generally similar to that of FIG. 2 except that the bag 44 is omitted. Similar reference numerals are used for corresponding parts. A sealing ring 46 seals the cap 22 against the cylinder 10. The gas chamber 45 is now provided in the space within the cylinder 10 above the hydraulic fluid which has a level marked at 47 in FIG. 3. The indicates an equilibrium state with the vehicle at rest. It will be understood that in operation, the gas 45 may become mixed with the hydraulic fluid in the cylinder to form voids or cavitations or possibly an emulsion. The example of FIG. 3 operates in the same way as already described with reference to FIG. 2.

FIG. 4 shows the exterior of an extended damper in which the cylinder 10 has an end region 9 of enlarged diameter. It also illustrates the protective shroud 65 which surrounds the piston rod 8 when extended. Fixing rings 66 and 67 are provided at opposite ends of the damper unit. The internal structure is illustrated in FIG. 5 and similar reference numerals are used for parts corresponding to those already described. The bag 44 is located in the enlarged end 9 of the cylinder 10. Gas is supplied to the space 45 in the bag 44 through a self sealing rubber plug 69 in the cap 22. The piston 20 is shown in the fully extended position. The slot 51 in the liner 16 is shown with maximum width 53 approximately one third the way along the cylinder from the lower end with ring 66. The slot 51 tapers inwardly uniformally on moving from the region 53 towards opposite ends of the liner 16.

It will be seen that the provision of compressible gas in the bag 44 or other means, will compensate for temperature variations. As the operating temperature of the damper varies, the pressure exerted by the bag on the fluid will vary, due to expansion of both fluid and gas, and therefor alter the damping characteristics. Similarly, the compressible gas will provide additional compensation for vehicle loading when a variable rate damper is used. In the arrangement described in FIG. 2, a tapered slot is provided which gives variable damping to suit the vehicle load. The piston will normally be located adjacent a different width of slot depending on the vehicle loading and therefor provide a different resistance to fluid flow past the piston. However, the different position of the piston within the cylinder causes a different extent of piston rod to be located within the cylinder and this causes a varying extent of compression of the bag 44. This in turn alters the limiting effect of the bag 44 on the pressure differential across the piston and can be used to provide more uniform damping characteristics for variable vehicle loads when using variable rate dampers. In this way, the bag 44 allows the variable rate damping which is provided by the tapered slot, to remain effective over a variety of operating conditions. The shape of slot 51 may of course be determined by the damping characteristics which are required at various extents of compression or extension during the bump and rebound strokes rather than the vehicle load.

The provision of the variable cross section slot 51 is particularly suited to the provision of an hydraulic stop at the full rebound position when the damper is fully extended. As shown in FIG. 2, the narrow region 52 at the upper end of the slot provides stiff hydraulic resistance to further extension of the damper as may occur when a wheel passes over a hole in a road. By closing the slot 51 at its upper end a high degree of hydraulic resistance to further extension acts as a hydraulic stop. This does not require any additional components in the damper nor any increase in length of the damper.

On compression of the damper the fluid flow through the pasages 54 tends to prevent closure of the slot 51 acting as an hydraulic stop on the bump stroke. However the alternative arrangement shown in FIG. 6 may be used to increase the hydraulic resistance at the end of the compression stroke. In this arrangement the piston 20 includes one way valves 70 controlling a plurality of passages 71 fed from an annular groove 72 in the side of the piston 20. The groove 72 communicates with the slot 51. At the end of the bump stroke, the piston reaches the closed end 55 of the slot 51, as shown in broken lines, and this causes a substantial reduction in the fluid which is able to enter the groove 72 and thereby a substantial hydraulic resistance is provided to further compression of the damper.

The invention is not limited to the foregoing details. Instead of charging the bag through a ball valve or by a hypodermic needle other means may be used.

Instead of using a gas filled bag other compressible volumes may be located within the cylinder to act as the compressible means.

This space can contain one or more springs such as helical or spiral volute springs. A diaphragm may be incorporated. As a further alternative the compressible means may include a mass of closed cell foam.

It will be appreciated that the gas space 45 can be compressed by the relatively incompressible fluid within the cylinder and thereby exert a pressure on the fluid which depends on the extent to which the gas is compressed. The gas provides a means of limiting the extent of pressure differential which can be maintained across the piston. Relative movement by the piston may cause cavitation within the fluid on the side of the piston remote from the gas space 45. The gas will affect the damping characteristics. This pressure can be varied by suitable adjustment of the pressure within the gas space 45 when the damper is set up in equilibrium conditions.

In the examples shown in FIGS. 2 and 5, the pressure within the bag 44, when the piston 20 is at rest and the fluid in equilibrium, may preferably be between 8 and 20 bars. The bag acts particularly well with a pressure of 8 to 15 bars. When the bag 44 is omitted as shown in FIG. 3, the gas pressure in the gas space 45 may be higher, e.g. 8 bars to 27 bars and 20 bars is particularly suitable.

The above examples may be used in a variety of vehicle suspension systems including tracked vehicles or aircraft. These may include wheels or support skids.

What is claimed is:

1. Vehicle suspension apparatus including damper means in the form of a piston and cylinder device, which apparatus comprises:
   (1) a cylinder member containing fluid, said cylinder member being closed at a first end,
   (2) compressible gas in a chamber located at an end of said cylindrical member opposite said first end and forming an axial extension of said cylindrical member whereby said compressible gas acts on the fluid in said cylindrical member to apply a variable pressure on the fluid during relative movement of the piston to control the damping characteristics,
   (3) a piston located within said cylindrical member and a piston rod connected to the piston and extending outside said cylindrical member, said piston and cylindrical member being relatively movable in a first direction to elongate the piston and cylinder device and relatively movable in a second opposie direction to shorten the piston and cylinder device, and
   (4) fluid passage means to permit fluid flow past the piston during relative movement of the piston and cylindrical member, said fluid passge means comprising:
      (a) a first fluid flow passage which is bidirectional and adjacent the piston to control pressure differential across the piston, said first fluid flow passage including an elongated slot extending longitudinally along the cylindrical member between the piston and cylinder, the slot having a cross-section which varies along the length of the slot to suit the required damping characteristics and being closed at one end to prevent fluid passage, and
      (b) a second fluid flow passage together with valve means to provide differential resistance with valve means to provide differential resistance to relative movement of the piston in opposite directions, said valve means permitting no fluid flow during relative movement in said first direction to lengthen the piston and cylinder device, whereby said slot provides an hydraulic stop when the piston and cylinder device is fully extended.

2. Suspension apparatus according to claim 1, in which the compressible gas is contained in a flexible bag located at one end of the cylindrical member around the piston rod.

3. Suspension apparatus according to claim 1, in which the compressible bag is contained in a chamber at one end of the cylindrical member in contact with the fluid and may mix with the fluid and form cavitations in the fluid.

4. Suspension apparatus according to claim 1, in which the damper means is provided with an end closure having a controlled passage leading to the gas space to permit charging with gas.

5. Suspension apparatus according to claim 4, in which the passage in the end closure has a self sealing closure member which may be pierced for charging with gas and is able to reseal itself.

6. Suspension apparatus according to claim 4, in which the gas is at a pressure of from 8 to 27 bars.

7. Suspension apparatus according to claim 1, in which the damper means is located with spring means between a body of the vehicle and a vehicle wheel support whereby a piston takes up a rest position in said cylinder dependent on the vehicle loading, the variable cross-section of the fluid passage means thereby causing the damper means to provide variable damping characteristics which are automatically adjusted in dependence on the vehicle loading.

* * * * *